United States Patent
Koslow

(10) Patent No.: US 9,375,724 B2
(45) Date of Patent: Jun. 28, 2016

(54) METHOD OF AND APPARATUS FOR SEPARATING OUT MATERIALS HEAVIER THAN PLASTIC, IN PARTICULAR METALS, BY FLOTATION IN A WATER BATH, IN A SEPARATION OF PLASTICS OF DIFFERENT DENSITIES

(76) Inventor: Alexander Koslow, Landshut (DE)

( * ) Notice: Subject to any disclaimer, the term of this patent is extended or adjusted under 35 U.S.C. 154(b) by 1553 days.

(21) Appl. No.: 12/497,329

(22) Filed: Jul. 2, 2009

(65) Prior Publication Data

US 2010/0000912 A1    Jan. 7, 2010

Related U.S. Application Data

(63) Continuation of application No. PCT/DE2007/000734, filed on Apr. 25, 2007.

(30) Foreign Application Priority Data

Jan. 12, 2007 (DE) .......................... 10 2007 001 809

(51) Int. Cl.
| | |
|---|---|
| B03B 5/00 | (2006.01) |
| B03B 5/36 | (2006.01) |
| B03B 5/40 | (2006.01) |
| B29B 17/02 | (2006.01) |
| B29K 705/00 | (2006.01) |

(52) U.S. Cl.
CPC ... B03B 5/36 (2013.01); B03B 5/40 (2013.01); B29B 17/02 (2013.01); B29B 2017/0244 (2013.01); B29B 2017/0268 (2013.01); B29K 2705/00 (2013.01); Y02W 30/524 (2015.05); Y02W 30/622 (2015.05)

(58) Field of Classification Search
CPC .......... B03B 5/40; B03B 5/623; B03B 11/00; B29B 17/02
USPC ................. 209/162–172, 379, 381
See application file for complete search history.

(56) References Cited

U.S. PATENT DOCUMENTS

2008/0110806 A1    5/2008    Koslow

FOREIGN PATENT DOCUMENTS

| DE | 939561 C | 3/1956 |
|---|---|---|
| DE | 1102661 B | 3/1961 |
| DE | 4217464 A1 | 12/1993 |
| DE | 102005021091 A1 | 11/2006 |

(Continued)

OTHER PUBLICATIONS

International Search Report and Written Opinion of the International Searching Authority (translation); PCT/DE2007/000734; Sep. 13, 2007; 8 pages.

*Primary Examiner* — Joseph C Rodriguez
*Assistant Examiner* — Kalyanavenkateshware Kumar
(74) *Attorney, Agent, or Firm* — Whitmyer IP Group LLC

(57) ABSTRACT

A process and device for separation of plastic material from other stuff of a various density by a flotation process in a liquid bath. The process involves discharging heavier stuff that settles on the screen bottom by a movable screen bottom slowly moves in the direction of reducing a slot that exists between one edge of screen bottom and the wall of the flotation tank and then after having reached a final position too quickly and abruptly move in the counter-direction. That movement occurs in intervals. This abrupt motion of screen bottom initiates that kinetic energy accumulated in the heaps of metal and other heavy stuff moves this stuff towards the slot-edge and through the slot into a collection-container underneath the screen bottom to be discharged.

12 Claims, 4 Drawing Sheets

(56) References Cited

FOREIGN PATENT DOCUMENTS

| | | | |
|---|---|---|---|
| GB | 1562266 A | 3/1980 | |
| JP | 4080903 A | 7/1992 | |
| JP | 10086153 A | 4/1998 | |
| JP | 10235644 A | 9/1998 | |
| JP | 2000167699 A | 6/2000 | |
| JP | 2008540155 T | 11/2008 | |
| WO | 2006119721 A1 | 11/2006 | |

METHOD OF AND APPARATUS FOR SEPARATING OUT MATERIALS HEAVIER THAN PLASTIC, IN PARTICULAR METALS, BY FLOTATION IN A WATER BATH, IN A SEPARATION OF PLASTICS OF DIFFERENT DENSITIES

CROSS-REFERENCE TO RELATED APPLICATIONS

The present application is a continuation of pending International patent application PCT/DE2007/000734 filed on Apr. 25, 2007 which designates the United States and claims priority from German patent application 10 2007 001 809.8 filed on Jan. 12, 2007, the content of which is incorporated herein by reference.

FIELD OF THE INVENTION

This invention relates to a process and device for removing deposits of metal on a screen bottom of a flotation unit that serves for separating of plastic materials of varying density from stuff that is heavier than plastics.

BACKGROUND OF THE INVENTION

Process and devices are known to separate a conglomerate of substances into the various individual substances by cutting the conglomerate using a shredder in order to prepare the substances for re-usage. Conglomerates of materials made from plastic materials of different chemical composition and density are to be separated in a flotation process, whereby the heavier plastic material settles on a screen bottom in a flotation tank and will from there be removed. Flotation liquid normally is pure water. In order to achieve a clear separation of plastic materials of different density in pure water, undesired movements of the flotation liquid should unalterably be avoided or at least such movements should be restricted to a minimum.

Together with a conglomerate of plastic materials, prepared by a shredder, ferromagnetic and non-magnetic metal stuff or other materials, heavier than plastic materials, will enter into the flotation tank and will settle on the screen bottom, preferably in small heaps. Lighter plastic materials in such conglomerate need more time for settling than heavier particles, and hence, together with flotation liquid, will be removed from the upper part of the flotation tank. A separation of plastic materials in accordance with their density did at that stage not yet take place. That separation of plastic materials in accordance with their density happens in a second follow-up stage. Materials, heavier than plastics, which settled in the course of the first stage on the screen bottom lead to serious problems, since they close the openings of the screen bottom and prevent a free flow of flotation liquid. Efficiency of the separation process of a conglomerate of stuff is therefore seriously affected.

One object of this invention is to develop a process for separation of plastic material from other stuff of a various density by a flotation process in a liquid bath. Conglomerates of plastics fed into flotation baths often contain metals—iron and non-ferrous components and other stuff—that are heavier than plastics. This stuff in the conglomerate to be separated is heavier than plastics and therefore quickly settles on the screen bottom while particles of plastics are still floating in the flotation bath. Still floating particles of plastics are transferred to a second stage of flotation and separated in accordance of their differing density. Heavier stuff of the conglomerate that settle in the first stage easily lead to a closure of the openings for liquid passing through screen bottom. It is, therefore, one object of this invention to discharge this stuff, that mostly settles as heaps on the screen bottom, avoiding disliked motion of flotation liquid in flotation tank, in order to prevent that stuff already settled again floats and mixes with still floating plastic particles. This invention recommends that a movable screen bottom slowly moves in the direction of reducing a slot that exists between one edge of screen bottom and the wall of the flotation tank and then after having reached a final position to quickly and abruptly move in the counter-direction. That movement occurs in intervals. This abrupt motion of the screen bottom initiates that kinetic energy accumulated in the heaps of metal and other heavy stuff moves this stuff towards the slot-edge and through the slot into a collection-container underneath the screen bottom. From there this stuff can be discharged without any problem.

Hence, one object of this invention is to eliminate these heaps of metals on the screen bottom during operation without having any adverse influence on the separation process for plastic materials from metals or other heavy staff. Scraping or washing off of such particles is to be avoided, since that would create undesired motion in the flotation tank and hence, would have a negative influence on the separation process for plastics of different density from other stuff.

SUMMARY OF THE INVENTION

This problem is sorted out by disposing the screen bottom in the flotation tank of the first separation stage, to a horizontal motion, in order to sort out stuff heavier than plastic materials, in such a manner that between one wall of the flotation tank and one edge of the screen bottom a slot is opened when the screen bottom moves in the direction to reach its final position at the flotation tank wall opposite to the first wall. The screen bottom is combined with a drive to perform its horizontal movement. That drive could be of a hydraulic, magnetic, mechanical or electro kind.

In order to dispose the screen bottom in the flotation tank at least two guiding beams and support bars are provided which carry the screen bottom. In order to minimize motion of the flotation liquid when moving the screen bottom, these support bars may be shaped in a streamline way and thus avoid creation of a whirling motion. A control device co-operates with the drive in such a way that the screen bottom moves in the direction of narrowing the slot slowly and after having reached its final position in this direction abruptly accelerates in the opposite direction and when reaching its final position in that opposite direction as all of a sudden it stops. Such movement will be repeated in intervals and results in a continuously repeated quick and sudden acceleration and an abrupt deceleration follows till the screen bottom is completely stopped in order to make metal heaps, due to accumulated kinetic energy, move on the screen bottom towards the slot until they fall through the slot into a collection container. From there they may be discharged through a sluice. That operation is similar to a process by which the screen bottom is suddenly pulled off underneath of the heaps of metal. Inertia of a mass of the metal heaps is used for moving them on the screen bottom towards the slot and into the collection container. This procedure is repeated in intervals as frequently as necessary to finally transport all metal heaps through the slot, that is formed between one edge of the screen bottom and the corresponding wall of the flotation tank, and make them fall into the collection container. By such procedure metal particles are discharges from the screen bottom and may be supplied to a re-usage process.

DETAILED DESCRIPTION OF THE INVENTION

Figure 1:
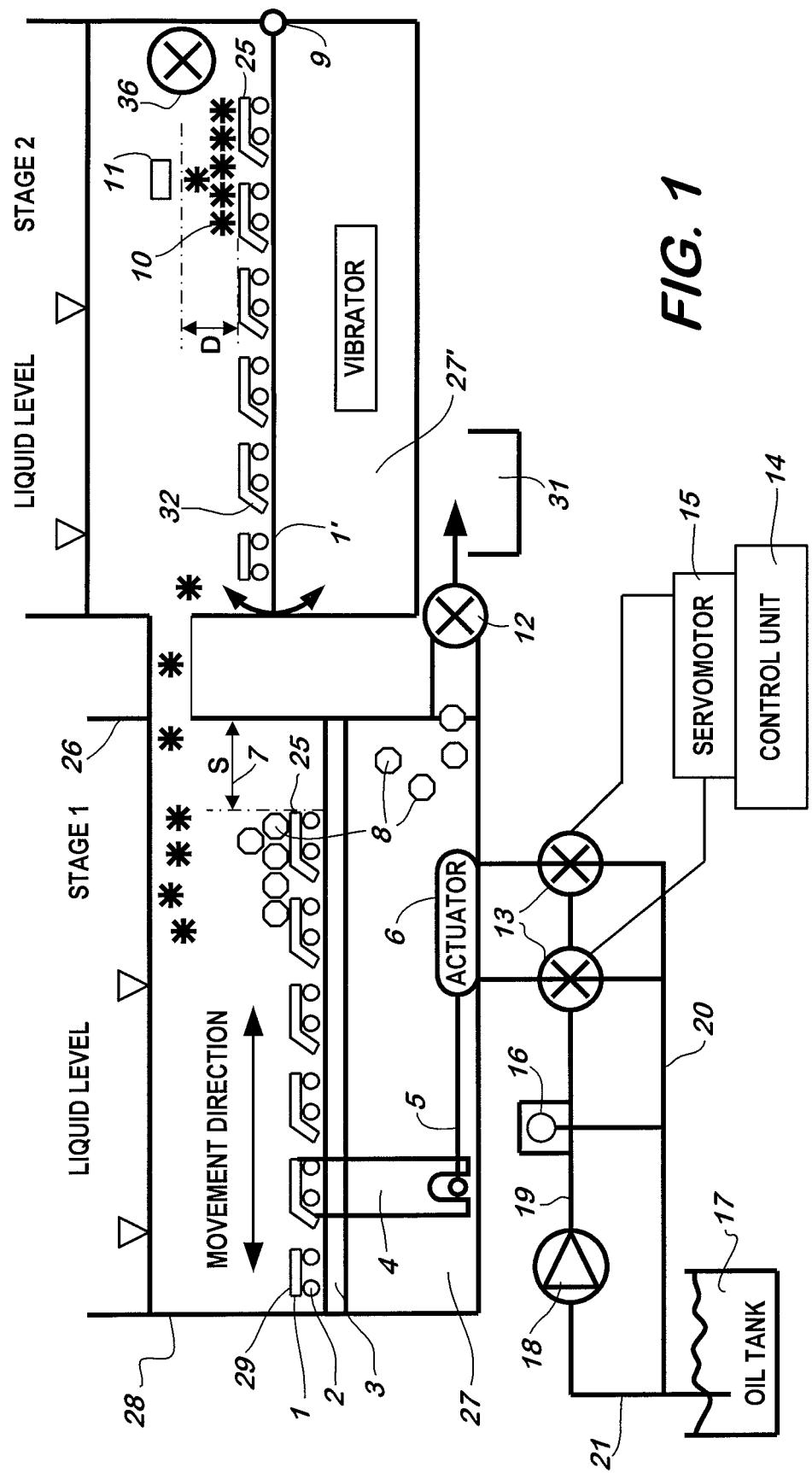
FIG. 1 is a schematic diagram illustrating a system according to an embodiment of the present invention.

This invention relates to a process and device for removing deposits of metal on a screen bottom (1) of a flotation unit that serves for separating plastic materials of varying density from stuff that is heavier than plastics. That is particularly in order to maintain a screen bottom (1) in a flotation tank (27) functional so that it continues to serve separation of plastic materials of various chemical compositions by using a flotation process and for separation of all materials heavier than plastics. When separating such a conglomerate of varying stuff such as plastics, ferrous and non-ferrous materials, as well as gravel and stones, that normally undergo a first rough treatment by a shredder, that means masticating into particles of about similar size, followed by a flotation process comprising several stages. In the first stage heavy metal particles that are contained in a conglomerate of materials that settle as heaps (8) on the screen bottom (1), lighter plastic particles remain in a floating stage in the first flotation tank and hence, can easily be transferred to a second stage into a follow-up flotation tank for separation of plastic materials of different density. Heaps of metal (8) that settle on the screen bottom (1) of the first stage cannot easily be removed. Scratching or washing them off by a liquid jet is not practicable, since such measures would create an undesired motion of the flotation liquid and that would negatively influence the separation process or even stop it. To the contrary such additional motion of the flotation liquid leads to re-mixing of plastic and metal particles. Therefore, this invention leaves a slot "S" (7) between a rear wall (26) of the flotation tank (27) and the corresponding edge (25) (width side) of the screen bottom (1) whenever the screen bottom (1) reaches its final position and prior to touching the front wall (28) of the flotation tank (27). Screen bottom (1) is carried by a guiding beam (3) on roller or pad-type bearings (2) that allow horizontal movements in the direction of the arrow. An actuator e.g. hydraulic motor (6) acts on the screen bottom (1) by a linkage formed by levers (4) and a piston-rod (5) that are controlled by a control unit (14) so that the screen bottom (1) conducts a horizontal movement. A hydraulic motor (6) (actuator) is connected to a hydraulic-fluid containing reservoir (17) by a high-pressure duct (19). A hydraulic pump (18) delivers hydraulic-fluid through the duct (19) to the hydraulic motor (6) from the hydraulic-fluid reservoir (17) via a suction duct (21). A surcharge-valve (16) maintains the pressure in the high-pressure duct (19) by releasing and making hydraulic fluid return through a return-flow pipe (20) to a hydraulic-fluid reservoir (17). Up-stream of the hydraulic motor (6) control valves (13) are placed in the high-pressure duct (19) and those are handled by a control unit (14), operated by a servo-motor (15), in such a way that alternatively the first or the following pressure chamber (23 "A" or 24 "B") of the hydraulic motor (6) is connected to the high-pressure duct (19). A cylinder in which a freely movable piston (22) is located which creates pressure chambers (23 and 24) and that piston (22) is linked to a piston rod (5). Pressure chamber (23"A") when not anymore connected to high-pressure duct (19) is then in connection with hydraulic-fluid reservoir (17) through a return-flow pipe (20) to enable return of hydraulic fluid from pressure chamber (23"A") to hydraulic-fluid reservoir (17). At the same time in pressure chamber (24"B") hydraulic fluid starts to act, since control valve (13) was opened. Both pressure chambers (23"A" and 24"B") are separated and sealed from one another against any fluid leakage via piston (22) that slides in the cylinder (30). Piston (22) actuates via a linkage (4 and 5) in a positive or non-positive way moving the screen bottom (1). Control device (14) triggers hydraulic motor (6) in such a way that firstly in a slow motion screen bottom (1) is moved in direction of reducing slot (7) and then accelerating, more or less shooting screen bottom (1) in the counter direction so that so far closed slot (7) re-opens. After having reached the other final position (maximum opening of the slot) screen bottom (1) is abruptly stopped to zero. Kinetic energy accumulated in metal heaps (8), due to preceding fast motion, continues to act and to makes metal heaps (8) sliding over screen bottom (1) till this energy is consumed or till metal heaps (8) will have fallen over the edge (25) through the slot S (7) into a collecting container (31). That process is repeated in intervals. Metal particles are discharged through a sluice (12).

Screen bottom (1') in the second stage and its fixation (suspension bar 3) may be swivelling pivoted to the horizontal axle of a ball and socket joint (9), so that by varying inclination of screen bottom (1') thickness "D" of the sediment of settled plastic particles (10) can be adjusted in addition to that of the adjustable flaps (32). Thickness "D" should be about homogeneous over the total screen bottom (1'). Sensors for measuring (11) are distributed over the total screen bottom (1') and communicate control instructions to a control device that governs the inclination of screen bottom (1').

Figure 2:
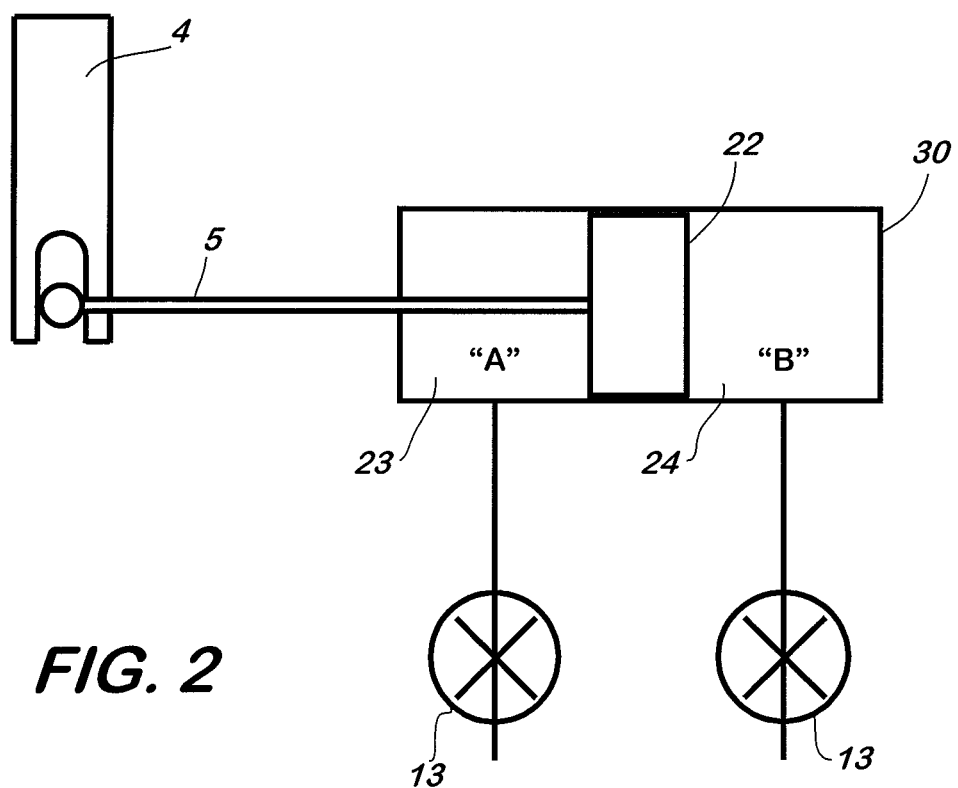
FIG. 2 shows a hydraulic motor that comprises a cylinder in which slides a piston that separates in cylinder two high-pressure chambers from one another that are alternatively connectable via control valves to high-pressure duct.

FIG. 2 shows a hydraulic motor (6) that comprises a cylinder (30) in which slides a piston (22) that separates in cylinder (30) two high-pressure chambers (23 and 24) from one another that are alternatively connectable via control valves to high-pressure duct (19). Piston (22) is engaged with at least one piston rod (5) that actuates together with a lever (4) on screen bottom (1) for moving it in the way afore described. One of the high-pressure chambers (22 or 23) is always connected to high-pressure duct (19) while the other-one is in connection with return-flow pipe (20) for release via a control valve (13).

Figure 3:
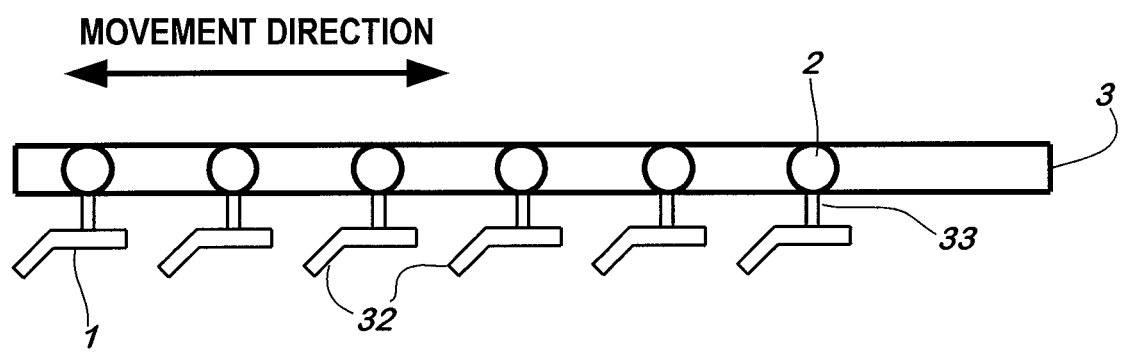
FIG. 3 shows a schematic way to suspend and support the movable screen bottom.

FIG. 3 shows one possibility to suspend and support the movable screen bottom (1). For this solution the movable screen bottom (1) is attached to roller rail (3) by support bar (33). This figure also shows adjustable flaps (32) underneath of the screen bottom (1).

Figure 4:
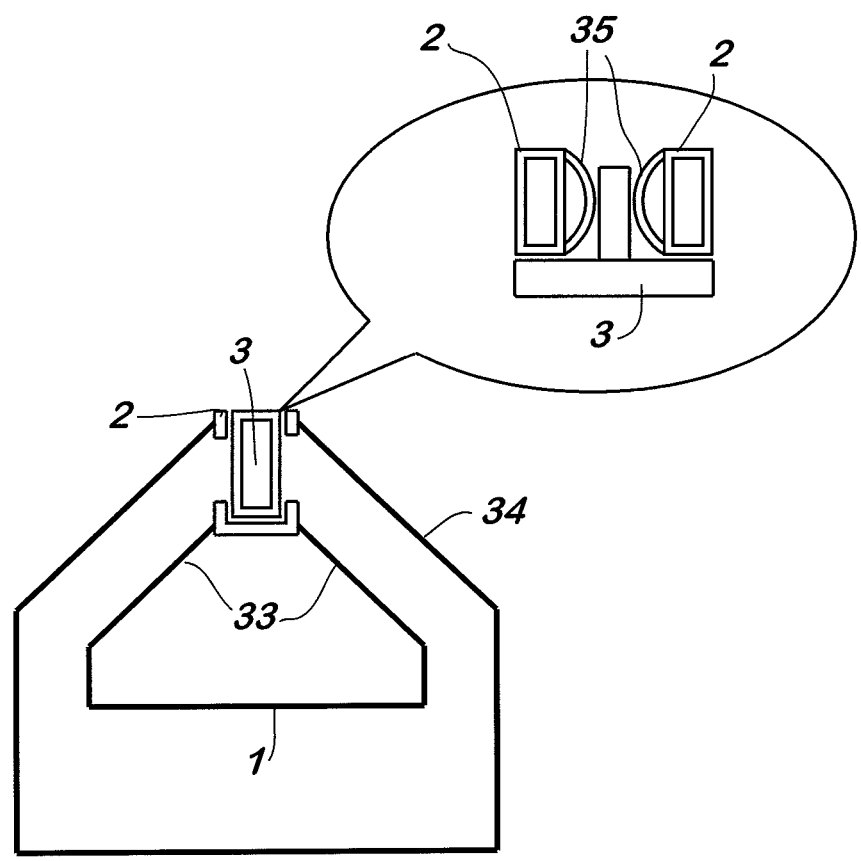
FIG. 4 shows a schematic way for supporting the screen bottom with rollers sliding on a roller rail that is located over the central part of the flotation tank and that is supported by supporters that are attached to the walls of the flotation tank.

FIG. 4 shows a possible way for supporting screen bottom (1) with rollers sliding on a roller rail (3) that is located over the central part of the flotation tank (27) and that is supported by supporters (34) that are attached to the walls of the flotation tank (27). Support bars (33) of the movable screen bottom (1) are designed in an appropriate manner. Rollers that slide on the roller rail (3) comprise curved flanks (35) either side of the rollers showing towards the roller rail (3) in order to minimize loss by friction at the roller rail (3) while moving the screen bottom (1).

What is claimed is:

1. A process for cleaning a screen bottom arranged in the first stage of a flotation process for separating a conglomerate of plastic material dependant from density and from all other material, the flotation process comprising a first stage where all material heavier than plastics is separated from plastics and settle on a screen bottom and a second stage where still floating plastic material is separated depending upon varying density, the process comprising the steps of:
   moving the screen bottom of first stage slowly in intervals to a final position minimizing a slot between one wall of the flotation tank and one edge of the screen bottom;
   moving the screen, after it reaches the final position, via an accelerated countermovement to an opposite final position opening the slot; abruptly stopping movement of the screen when the screen reaches the opposite final position.

2. The process of claim 1, further comprising the step of providing a control device adapted to move the screen bottom by servo-unit wherein the servo-unit is a hydraulic motor that is fixed to the wall of the flotation tank, said servo-unit having a piston sliding in a cylinder subdividing the cylinder into two pressure-chambers that are connected to a high-pressure duct supplied by a high-pressure pump controlled by the control unit co-operating with control valves.

3. The process of claim 2, wherein the servo-unit comprises a hydraulic motor, wherein a pressure relief valve is placed in a highpressure duct to limit maximal pressure in the high-pressure duct and enables a flow-back to a hydraulic reservoir through a return pipe as soon as maximum pressure has been achieved.

4. The process of claim 3, wherein the jerk-like motion of the screen bottom happens by a sudden and immediate changing of the connection of pressure chambers from load to unload by connecting an earlier pressure released chamber to a high-pressure duct and by connecting a pressurized chamber to a return pipe.

5. The process of claim 3, wherein the servo-unit is a hydraulic motor that is fixed to the wall of the flotation tank, said servo-unit having a piston sliding in a cylinder subdividing the cylinder into two pressure-chambers that are connected a pressure released return pipe controlled by a control unit co-operating with control valves.

6. The process of claim 1, wherein the screen bottom is adapted to co-operates with rollers that slide on a roller rail, said roller rail supported by supporters, that are attached to the outer wall of the flotation tank, and that carry the screen bottom by support levers.

7. The process of claim 6, wherein flanks of the rollers that slide along the roller rail are curved in order to minimize friction between the rollers and the roller rail.

8. The process of claim 6, wherein the support levers that act upon the screen bottom are a streamlined, curved shape.

9. The process of claim 1, wherein the screen bottom is at least connected to one trolley that slides along at least one rail that is centrally located above the flotation tank and that is supported by prop to the walls of the flotation tank.

10. The process of claim 1, wherein metal heaps that have fallen through the slot of the screen on the bottom of the flotation tank are discharged into a collection container and delivered to further usage.

11. The process of claim 1, wherein the control unit acts via a servomotor on the control valves.

12. An apparatus for performing a separation process by flotation of a conglomerate of plastic materials with different densities and of other material, the apparatus comprising:
   a first stage wherein all material heavier than plastics is settled on a screen bottom, the first stage having a screen bottom being movable horizontally and having such a shape that one edge of it ends in such distance from a wall of a flotation tank so as to minimize a slot when a final position of the horizontal movement is reached;
   a second stage to which the still floating plastic material is transferred for separation depending on different densities;
   a control device configured to move the screen bottom by servo-unit slowly in direction of minimizing the slot and then quickly in counter-direction to enlarge the slot with an abrupt stop and to repeat this motion of the screen bottom in intervals, so that the material settled on the screen bottom moves horizontally towards the slot until they fall through the slot.

* * * * *